United States Patent [19]
Kobayashi et al.

[11] Patent Number: 5,737,008
[45] Date of Patent: Apr. 7, 1998

[54] ELECTROPHOTOGRAPHIC IMAGE RECORDING APPARATUS WITH PHOTORECEPTOR EXPOSURE CONTROL

[75] Inventors: Shinya Kobayashi; Kunio Sato; Seiji Maruo; Susumu Saito, all of Ibaraki, Japan

[73] Assignees: Hitachi Koki Co., Ltd.; Hitachi, Ltd., both of Tokyo, Japan

[21] Appl. No.: 698,160

[22] Filed: Aug. 7, 1996

[30] Foreign Application Priority Data

Aug. 29, 1995 [JP] Japan ................................. 7-220627

[51] Int. Cl.$^6$ ................................. H04N 1/21; B41J 2/47
[52] U.S. Cl. ........................ 347/253; 358/298; 347/131
[58] Field of Search ................................. 347/253, 131, 347/240, 132, 135; 358/298

[56] References Cited

U.S. PATENT DOCUMENTS 5,319,393  6/1994  Genovese ................. 358/298

FOREIGN PATENT DOCUMENTS 48-37148   6/1973   Japan .
1-287581   11/1989  Japan .................. G03G 15/01
6-97580    4/1994   Japan .................. H01S 3/18

*Primary Examiner*—Mark J. Reinhart
*Attorney, Agent, or Firm*—Sughrue, Mion, Zinn, Macpeak & Seas, PLLC

[57] ABSTRACT

An electrophotographic image recording apparatus that forms an electrostatic latent image so that the uniformly charged surface of a photoreceptor is scanned for its exposure with a beam spot of a light beam generated according to image information, to discharge the surface of the photoreceptor up to a medium potential. The electrophotographic image recording apparatus includes a light beam generator capable of varying an amount of light beam and a light intensity distribution pattern of a beam spot on the surface of the photoreceptor, an intensity distribution pattern controller for controlling the light beam generator according to the image information of peripheral pixels, to vary the intensity distribution pattern of the beam spot on the surface of the photoreceptor, and a light beam output controller for controlling the light beam generator to put the exposure energy on pixels, exposed to the beam spots of intensity distribution patterns, at a predetermined value.

5 Claims, 6 Drawing Sheets

ELECTROPHOTOGRAPHIC IMAGE RECORDING APPARATUS WITH PHOTORECEPTOR EXPOSURE CONTROL

BACKGROUND OF THE INVENTION

1. Field of the Invention

The present invention relates to an image forming apparatus for recording an image on a recording medium by an electrophotographic process. More particularly, the invention relates to a photoreceptor exposure control device suitable for forming a stable surface potential (electrostatic latent image) of the photoreceptor.

2. Discussion of the Prior Art

In a known electrophotographic process (hereinafter referred to as "a conventional technique 1"), to start with, the surface of a photoconductive means or a photoreceptor is uniformly charged. Then, the charged surface of the photoreceptor is exposed to a light beam containing image information, viz., it is scanned with the light beam. With the scan, the charged surface is discharged to form an electrostatic latent image thereon. The latent image is developed, with toner, into a toner image. The toner image is transferred onto a recording medium or a recording paper. Various apparatuses for recording a color image, designed on the basis of the electrophtographic process, have been developed and put into practical use.

A small and high speed image forming apparatus, based on the electrophotographic process, is disclosed in Japanese Patent Laid-Open Publication No. Sho. 48-37148 (hereinafter referred to as "a conventional technique 2"). Through one scan by a light beam containing image information of two colors, two electrostatic latent images of two different potentials are formed. The two electrostatic latent images are normally and reversely developed with toner of two colors into toner images of two colors.

In the conventional technique 2, it is necessary to vary the surface potential of the photoreceptor including the nonexposing area thereof, in at least three levels in one scan for exposure. In the conventional technique 1, the electrostatic latent image is defined by presence or absence of charge (two levels) on the photoreceptor surface. Accordingly, the exposure control required for the conventional technique 1 is simple; to generate, for an exposing area, a light beam intensive enough to discharge the exposing area to a saturation level, and to stop the generation of a light beam for a nonexposing area. On the other hand, in the conventional technique 2 in which the surface potential is varied in three levels to form an electrostatic latent image, a medium potential is required in addition of the two levels in the conventional technique 1. The medium potential is formed in a region where a variation of the surface potential to the exposure energy is within a saturation level. Accordingly, if the exposure energy slightly varies, the surface potential greatly varies. In case where a developing unit operates with a preset medium potential as a reference potential (white area), and an electrostatic latent image is developed by the developing unit, when the exposure energy varies, an actual medium potential is deviated from the preset one. Under this condition, toner attaches to the white image area (the medium potential area). The toner attached thereto appears as a called fog on the resultant image. The quality of the image is considerably deteriorated.

One of the factors to vary the exposure energy within the white image area is a variation of the spaces between the scanning lines. An increase of the scanning line density is equivalent to an increase of the exposure energy, and similarly a decrease of the scanning line density is equivalent to a decrease of the exposure energy. Therefore, toner of the normal or the reverse development attaches to the white image area. The toner attached thereto appears as a pattern of horizontal stripes on the resultant image. The exposure energy variation at relatively short periods (at the intervals of several scanning lines) is due to a slant of the polygonal mirror for deflecting the light beam, mechanical vibrations, irregular feeding of the photoreceptor, and the like.

The conventional technique 1 places the exposing area under an intensive light beam, and substantially suppresses a variation of the exposure energy, locally observed, by using the saturation characteristic of development. However, this technique is unapplicable to the exposure control for the white image area in the conventional technique 2. The reason for this is that if the white image area is exposed to the intensive light, the medium potential on the photoreceptor is lowered, and the toner of the reverse development attaches to the photoreceptor.

Another image forming apparatus for forming an image of two colors is disclosed in Japanese Patent Laid-Open Publication No. Hei. 1-287581 (hereinafter referred to as "a conventional technique 3"). The conventional technique 3 follows. In a first toner image forming process, a first electrostatic latent image, which corresponds to a first image to be subjected to a reverse development, for example, is formed on the photoreceptor charged positively, for example. The first electrostatic latent image is reversely developed with first toner charged positively, for example, to thereby form a first toner image. In a second toner image forming process, a second electrostatic latent image, which corresponds to a second image to be subjected to a normal development, for example, is formed on the photoreceptor. The second electrostatic latent image is normally developed with second toner charged negatively, to thereby form a second toner image. Finally, a toner image of two colors is recorded. The conventional technique 3 has also substantially the same problem as of the conventional technique 2 since the white image area of the second electrostatic latent image is set at the medium potential between the surface potential of the first toner image and the image area potential of the second electrostatic latent image.

SUMMARY OF THE INVENTION

The present invention has been made in view of the above circumstance, and therefore an object of the present invention is to suppress an exposure energy variation at relatively short periods (at the intervals of several scanning lines), which is observed in the white image area on the surface of the photoreceptor, and to form a quality white image area, not suffering from fog.

According to the present invention, there is provided an electrophotographic image recording apparatus which forms an electrostatic latent image in a manner that the uniformly charged surface of a photoreceptor is scanned for its exposure with a beam spot of a light beam generated in accordance with image information, to thereby discharge the surface of the photoreceptor up to a medium potential. The electrophotographic image recording apparatus comprises: light beam generating means capable of varying an amount of light beam and a light intensity distribution pattern of a beam spot on the surface of the photoreceptor; intensity distribution pattern control means for controlling said light beam generating means in accordance with the image information of peripheral pixels, to thereby vary the intensity distribution pattern of the beam spot on the surface of the photoreceptor; and light beam output control means for controlling said light beam generating means so as to put the exposure energy on pixels, exposed to the beam spots of intensity distribution patterns, at a predetermined value.

According to another aspect of the invention, there is provided an electrophotographic image recording apparatus which forms a first electrostatic latent image in a manner that the uniformly charged surface of a photoreceptor is scanned for its exposure with a beam spot of a light beam generated in accordance with first image information, to thereby discharge the surface of the photoreceptor to a medium potential, and a second electrostatic latent image in a manner that the surface of the photoreceptor is scanned for its exposure with a beam spot of a light beam generated in accordance with second image information, to thereby discharge the surface of the photoreceptor to a low potential. The electrophotographic image recording apparatus comprises: light beam generating means capable of varying an amount of light beam and a light intensity distribution pattern of a beam spot on the surface of the photoreceptor; intensity distribution pattern control means for controlling said light beam generating means in accordance with the image information of peripheral pixels, to thereby vary the intensity distribution pattern of the beam spot on the surface of the photoreceptor; and light beam output control means for controlling said light beam generating means so as to put the exposure energy on pixels, exposed to the beam spots of intensity distribution patterns, at a predetermined value.

A light intensity distribution pattern of a beam spot in a white image area is spread in accordance with image information of peripheral pixels, to thereby suppress a variation of exposure energy caused by a variation of the spaces between the scanning lines. Further, the exposure energy is controlled to have a fixed value for the intensity distributions. Accordingly, the exposure energy in the white image area is kept constant. The surface potential of the photoreceptor is stabilized.

The above and other objects and features of the present invention will be more apparent from the following description taken in conjunction with the accompanying drawings.

DETAILED DESCRIPTION OF THE PREFERRED EMBODIMENTS

A description will be given in more detail of the embodiment of the present invention with reference to the accompanying drawings.

Figure 1:
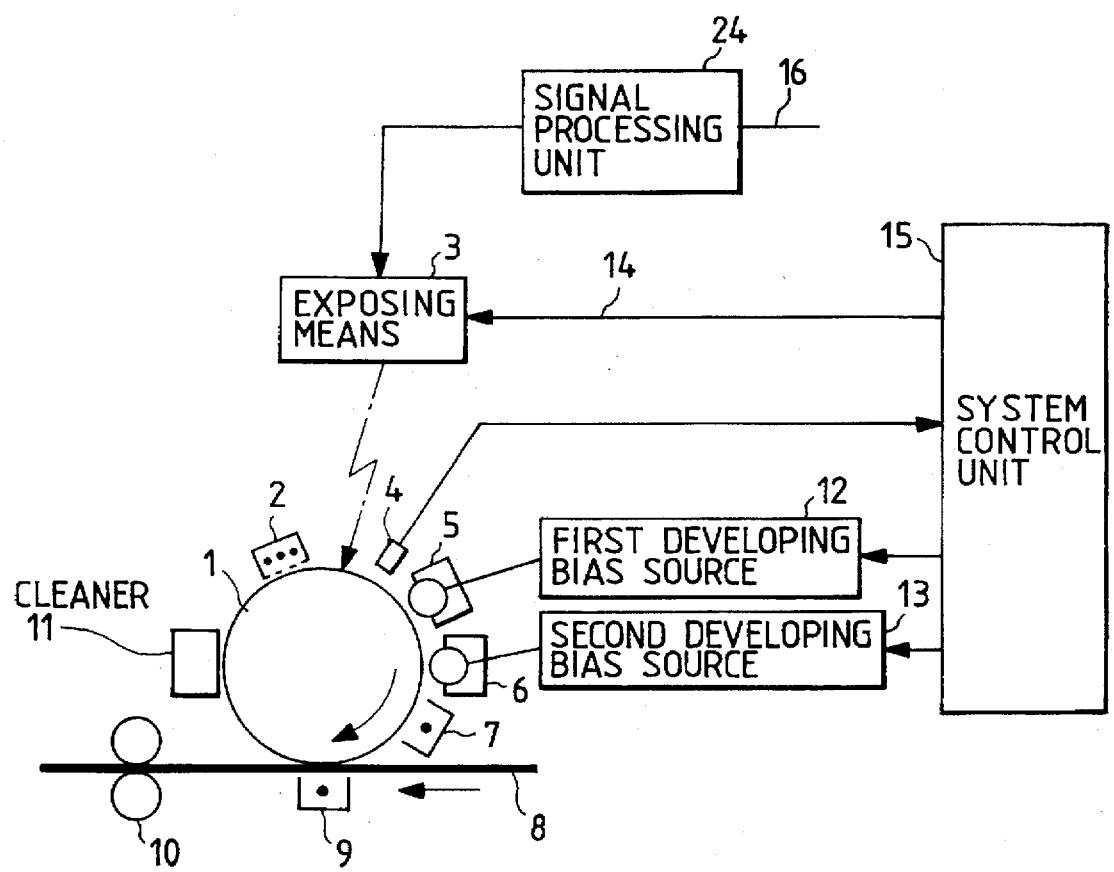
FIG. 1 is a schematically block diagram showing an image forming apparatus according to an embodiment of the present invention.

FIG. 1 is a schematically block diagram showing an image forming apparatus according to an embodiment of the present invention. In the figure, reference numeral 1 designates a photoreceptor in the form of a drum; 2, a charger; 3, an exposing means including mainly a laser device and its related optical system; and 24, a signal processing unit. The signal processing unit 24 modulates a laser beam emitted from the laser device in the exposing means 3, in response to an image information signal 16 derived from an image information source (not shown), such as a personal computer or a word processor. Numeral 4 represents a surface potential sensor; 5, a first developing unit forming a first developing means; 12, a first developing bias source for applying a bias voltage to the developing roll in the first developing unit 5; 6, a second developing unit forming a second developing means; 13, a second developing bias source for applying a bias voltage to the developing roll in the second developing unit 6; 7, a recharger; 8, a paper; 9, an image transferring unit forming an image transferring means; 10, a fixing unit forming a fixing means; 11, a cleaner; and 15, a system control unit (specifically a microcomputer with input and output terminals for receiving and output analog signals).

The operation of the image forming apparatus thus organized will be described. The photoreceptor drum 1 rotates at a fixed speed in the direction of an arrow. The charger 2 uniformly charges the surface of the rotating photoreceptor drum 1. The exposing means 3 generates a laser beam, which is modulated by an image information signal 16 in the signal processing unit 24, and projects it onto the surface of the photoreceptor drum 1, to form a beam spot thereon. The laser beam spot scans the uniformly charged drum surface to form an electrostatic latent image thereon. The signal processing unit 24 will be described in detail later.

Figure 3:
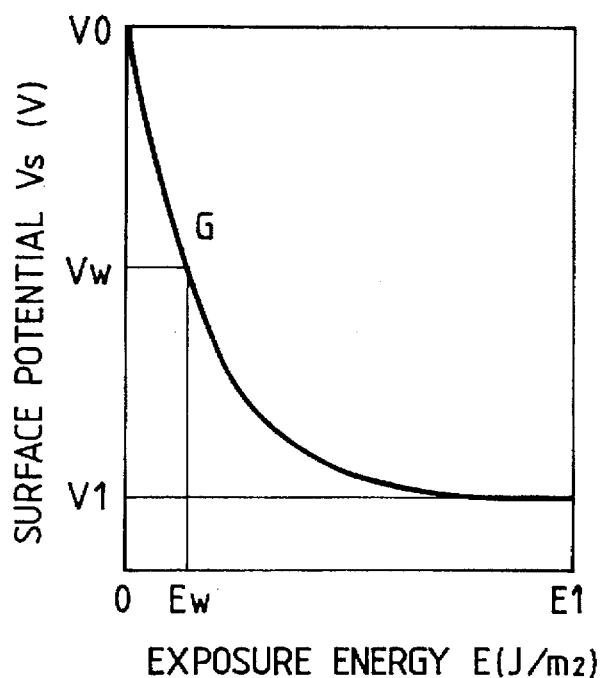
FIG. 3 is a graph showing a variation of the surface potential Vs of a photoreceptor with respect to an exposure energy E by a laser beam.

FIG. 3 is a graph showing a variation of the surface potential Vs of a photoreceptor with respect to an exposure energy E by a laser beam. The electrostatic latent image is at three potential levels. A first potential level is a potential $V0$ in a first color area not exposed to the laser beam. A second potential level is a potential $Vw$ in a white image area exposed to an exposure energy $Ew$. A third potential level is a potential $V1$ in a second color area exposed to an exposure energy $E1$. If the bias voltages generated by the first and the second developing bias sources 12 and 13 are set to have proper values, the latent image in the first color area at the potential $V0$ is normally developed by only the first color developing unit 5, to form a toner image of the first color. And the latent image in the second color area at the potential $V1$ is reversely developed by only the second developing unit 6, to form a toner image of the second color. The toner from the developing units 5 and 6 is not attached to the white image area at the potential $Vw$.

The toner of the first developing unit 5 is opposite in polarity to that of the second developing unit 6. Accordingly, the two different toner images (of the first color and the second color) are opposite in polarity. The two toner images are electrostatically transferred onto a recording paper. To this end, the recharger 7 charges the toner images again to arrange the toner images in the same polarity. The image transferring unit 9 electrostatically transfers the two toner images on the paper 8 moving in the direction of an arrow. The fixing unit 10 fixes the two toner images onto the paper 8. In this way, an image of two colors is recorded in the paper.

The cleaner 11 removes the toner left on the photoreceptor drum 1 after the image transferring process, and the photoreceptor drum is ready for the next recording operation.

The signal processing unit 24 will be described. The image information signal 16 consists of two bits (D1, D2) as shown in the following table, and is generated every pixel.

TABLE 1

| D1 | D2 | Printing color |
|----|----|----|
| 0 | 0 | White |
| 0 | 1 | 2nd development color |
| 1 | 0 | 1st development color |
| 1 | 1 | (Prohibit) |

Figure 2:
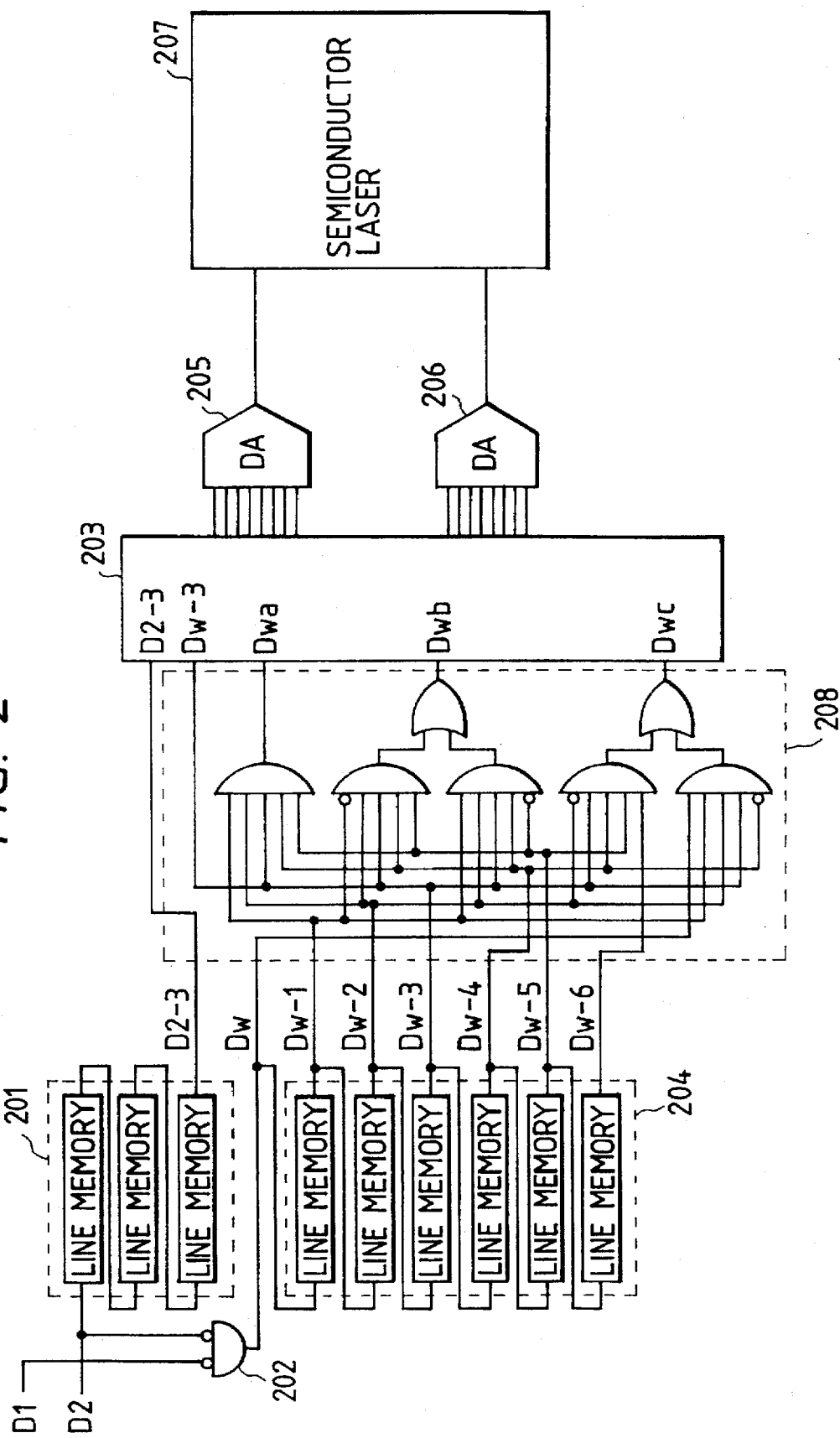
FIG. 2 is a block diagram showing a signal processing unit used in the image forming apparatus of the invention.

An arrangement of the signal processing unit 24 is shown in FIG. 2. A bit signal D2 is inputted to a known line memory 201 of three lines, and after it is delayed three lines by the line memory, it is outputted from the line memory 201, in the form of a signal D2-3. A memory 203 receives the signal D2-3 and stores it therein. An AND circuit 202 receives the inverted bit signals D1 and D2, logically multiplies them, and produces the result in the form of a noncolor signal Dw. A known line memory 204 of six lines receives the noncolor signal Dw, and delays it by one line to six lines and produces delayed signals Dw-1 to Dw-6. A logic circuit 208 receives the signals Dw, and Dw-1 to Dw-6, and logically processes them and produces signals Dw-3, and Dwa to Dwc. These signals have the following meanings.

Dw-3: Indicate the signal Dw delayed three lines.

Dwa: Indicate that the signals Dw-1 to Dw-5 are all "1's".

Dwb: Indicate that the signal Dw-1 is "0", and the signals Dw-2 to Dw-5 are all "1's", or that the signals Dw-1 to Dw-4 are all "1's" but the signal Dw-5 is "0".

Dwc: Indicate that the signal Dw-2 is "0", and the signals Dw-3 to Dw-6 are all "1's", or that the signals Dw and Dw-1 to Dw-3 are all "1's" but the signal Dw-4 is "0".

The memory 203 receives the five signals D2-3, Dw-3, and Dwa to Dwc as address signals, and produces a control signal of 8-bit wide for transmission to an intensity-distribution current source 205 and a light-power current source 206.

A semiconductor laser 207, used in the present embodiment, is capable of varying an intensity distribution pattern of a beam spot, formed when the laser beam lands on the photoreceptor surface, as disclosed in Japanese Patent Laid-Open Publication No. Hei. 6-97580. The semiconductor laser 207 includes an intensity-distribution control electrode for extending the length of the beam spot approximately three times only in the slow scan direction, in addition to a normal electrode. The intensity-distribution current source 205 and the light-power current source 206 are connected to the intensity-distribution control electrode and the normal electrode, respectively.

Figures 4A, 4B:
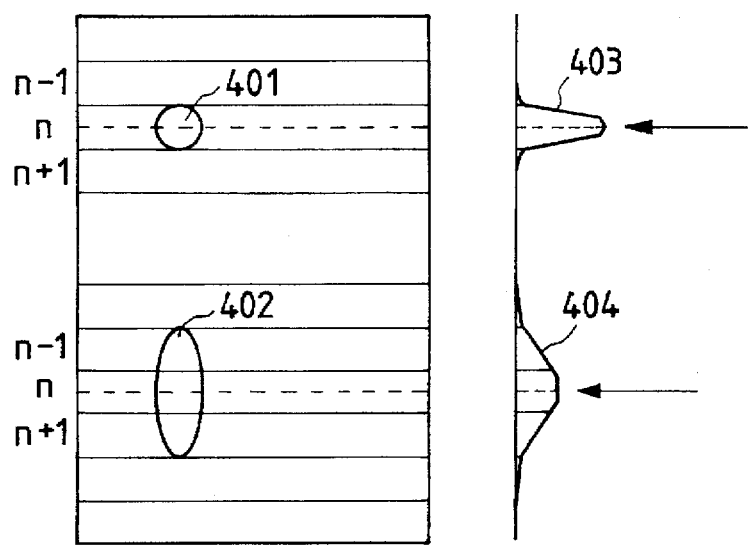
FIGS. 4A and 4B are diagrams showing an intensity distribution pattern of a laser beam, which is controlled in intensity distribution pattern.

FIGS. 4A and 4B and Table 2 show the results of the exposure control. FIGS. 4A and 4B show an intensity distribution pattern of a beam spot, formed when a laser beam outputted from the optical system of the exposing means 3 lands on the surface of the photoreceptor drum 1.

FIG. 4A is a development of the beam spot when the photoreceptor drum 1 is viewed in the normal direction. FIG. 4B is a development of the beam spot when the photoreceptor drum 1 is viewed in the tangential direction. The n-th scanning line and the scanning lines above and below the n-th scanning line, viz., the (n−1)th scanning line and the (n+1)th scanning line, are illustrated. And the laser beam is scanning the drum surface along the n-th scanning line. In FIG. 4A, a circle 401 indicates a pattern of the beam spot in a normal state (a contour at exp (−2) when the center intensity is 1). A circle 402 indicates a pattern of the beam spot when it is vertically extended. In FIG. 4B, curves 403 and 404 indicate intensity distribution patterns of those beam spots, respectively.

The beam spot 401 and 403, formed in a normal state scans, for exposure, a linear area almost within the n-th scanning line on the drum surface. The beam spot 402 and 404, formed when it is deformed or extended in the slow or vertical scan direction, scans the linear areas defined by the n-th, (n−1)th, and the (n+1)th lines. A degree of the deformation of the spot depends on the current from the intensity-distribution current source 205 and a light power of the whole spot depends on the current from the light-power current source 206. The current characteristics of the current sources 205 and 26 may be varied independently.

Values, obtained by the experiment or measurement, for the signals D2-3, Dw-3, and Dwa to Dwc, are stored in advance in the memory 203. When addressed by these signals, the memory 203 produces the corresponding values to the intensity-distribution current source 205 and the light-power current source 206, so that the intensity distribution pattern and the light power are properly controlled. The relative values of the exposure energy of the light beam landing on the three scanning lines, the (n−1)th, n-th and (n+1)th scanning lines, as shown in Table 2, may be obtained. In the table, Ew and E1 indicate those already stated in FIG. 3. In the table, * indicates that the signal may take any logical value, 1 or 0.

TABLE 2

| | Output of logic circuit | | | | Intensity distribution pattern & Light power | | |
|---|---|---|---|---|---|---|---|
| | D2-3 | Dw-3 | Dwa | Dwb | Dwc | n − 1 | n | n + 1 |
| (1) | 1 | 0 | * | * | * | 0 | E1 | 0 |
| (2) | 0 | 0 | * | * | * | 0 | 0 | 0 |
| (3) | 0 | 1 | * | * | 1 | Ew/4 | 2Ew/4 | Ew/4 |
| (4) | 0 | 1 | * | 1 | 0 | Ew/4 | 2Ew/4 | Ew/4 |
| (5) | 0 | 1 | 1 | 0 | 0 | 0 | 3Ew/4 | 0 |
| (6) | 0 | 1 | 0 | 0 | 0 | 0 | 4Ew/4 | 0 |

In table 2, the rows indicated by (3) to (6) describe a method of exposing the white image area. Those provide means to control an intensity distribution pattern of the light source on the basis of image information of peripheral pixels, and also an output control means for controlling the exposure energy on the photoreceptor drum 1 to a predetermined value. It will readily be seen that, in the cases of (3) and (4), the intensity distribution pattern is extended in the vertical scan direction. The exposure energy on the surface of the photoreceptor drum 1 are set at predetermined values. This fact will be described in detail later using a specific image. The data for providing the results, stored in the memory 203, were obtained in the following manner in the present embodiment.

The intensity-distribution current source 205 and the light-power current source 206 were independently, and a laser beam was emitted from the semiconductor laser 207. The laser beam was projected to and focused on a CCD camera. The intensity distribution pattern and the light power were simultaneously measured. The data to realize the contents of Table 2, to be stored in the memory 203, were determined on the basis of the results of the measurement. For the light power, the related instruments were arranged so as to control the light power even during the recording operation by a known light power control, which uses a photo sensor for sensing a light amount sensor contained in the laser device. The intensity distribution pattern may be controlled also during the recording operation in a manner that the laser beam is led to a known photo sensor of the split type through a half-mirror, for example.

Figures 5, 6:
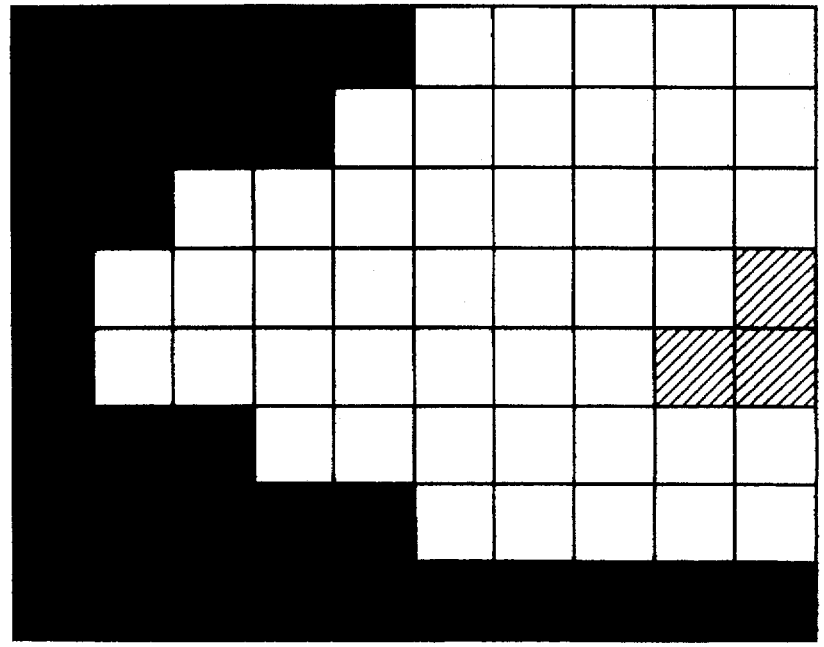
FIG. 5 is a diagram showing an example of an image to be recorded.
FIG. 6 is a diagram showing a distribution of exposure energy on the photoreceptor surface when an exposure control is performed according/to the rules of the invention.

The present embodiment will further be described by using a specific image to be recorded. FIG. 5 shows an example of an image to be recorded. The image consists of a white area represented by the signal 16 (D1, D2), a first development color area normally developed by the first developing unit 5, and a second development color area inversely developed by the second developing unit 6. Thus, the image is a called two-color image. FIG. 6 is a diagram showing a distribution of exposure energy on the surface of the photoreceptor drum 1 when an exposure control is performed according to the rules in Table 2. For the exposure energy within the white image area ((3) to (6) in Table 2), (Ew/4) representative of it is omitted for the limited spaces in the table. Accordingly, the product of a numeral in each pixel by E/4 represents a value of an actual exposure energy. In the cases of (3) and (4) in Table 2, the intensity distribution pattern of the laser beam is expanded to the adjacent scanning lines. For this reason, an elliptic curve is used for indicating the exposure energy. In FIG. 6, the exposure is discretely illustrated every pixel, for ease of understanding. Actually, the exposure successively progresses in the horizontal direction while the intensity distribution pattern and the light power are continuously varied also at boundaries each between the pixels.

Figure 7A:
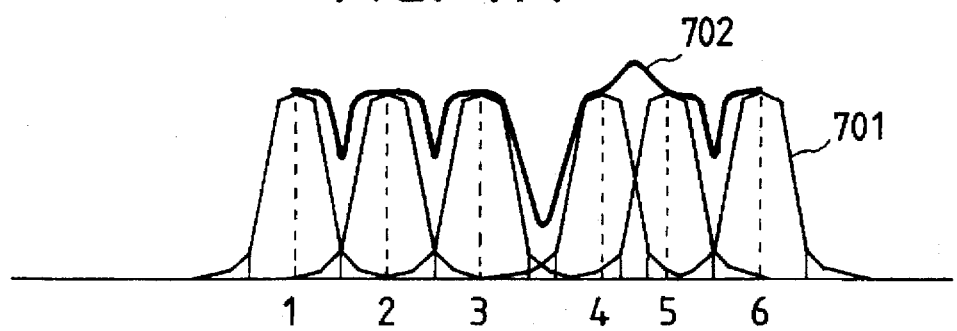
FIGS. 7A and 7B are diagrams comparatively showing exposure characteristics exhibiting the variations of the exposure energy on the drum surface, formed by a conventional device and the device of the invention.
Figure 7B:
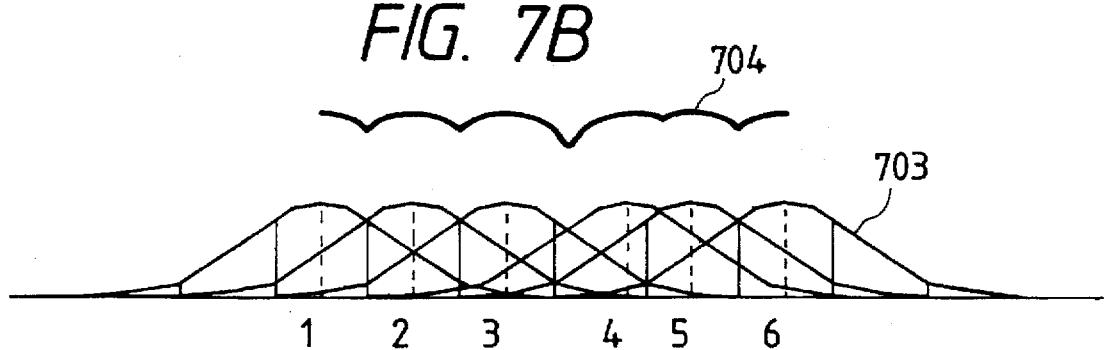

The fact that when an intensity distribution pattern of the light beam is spread, a variation of the exposure energy, which is caused by a variation of the spaces between the scanning lines, is lessened, will be described with reference to FIGS. 7A and 7B. The illustrations of FIGS. 7A and 7B are both for a case where the white image area is uniformly exposed. In the exposure of FIG. 7A, a light beam spot having an intensity distribution pattern ((6) in Table 2), produced by the conventional device, was used. A curve 701 indicates variations of the exposure energy each across the scanning line. A curve 702 indicates a variation of the actual exposure energy, formed by integrating each of the exposure energy variations across the scanning lines when the light spot scans the drum surface along all of the scanning lines. In the exposure of FIG. 7B, a light beam spot of which the intensity distribution pattern is extended in the vertical scan direction by the exposure control device ((3) in Table 2), was used. A curve 703 indicates variations of the exposure energy each across the scanning line. A curve 704 indicates a variation of the actual exposure energy, formed by integrating each of the exposure energy variations across the scanning lines when the light spot scans the drum surface along all of the scanning lines. The cross sections of the exposure energy variations when viewed in the scanning line direction are depicted in FIGS. 7A and 7B. In this instance, the spaces between the scanning lines are not uniform, so that the space between the third and the fourth scanning lines is wider than other spaces and the space between the fourth and the fifth scanning lines is narrower. As seen from the graph, the exposure energy a little varies in the wider space between the third and the fourth scanning lines, in the intensity distribution pattern of the light spot, which is extended in the vertical scan direction according to the present invention.

The exposure energy in the white image area will be described using FIG. 6 again. The total exposure energy of each pixel in the white image area is obtained by integrating the exposure energy on each scanning line over all the scanning lines in the pixel. In the present embodiment, even in the case where the intensity distribution pattern is extended in the vertical scan direction ((3) and (4) in Table 2), the exposure energy on one scanning line extends to only the above and the below scanning lines. Therefore, an exposure energy of the pixel in the white image area can be obtained by summing the exposure energy on a scanning line and the exposure energy on the scanning lines above and below the former. The exposure energy of each of the pixels in the white image area in FIG. 6 is Ew. Hence, if the surface potential, caused when the drum surface is exposed to the laser beam of the exposure energy Ew, is used as a reference potential, and the electrostatic latent image is normally and reversely developed so that toner is not attached to the surface area at the reference potential, no fog will never be formed in this area on the resultant image. The fact that the exposure energy on the photoreceptor drum 1 is fixed at Ew is not limited to the image under discussion, as a matter of course. The rules in Table may be described below using the white image area.

When the pixels successively appear in the slow scan direction (vertically in FIG. 6) in the white image area, the rules applied to the pixels and the locations of the pixels to which the rules are applied are indicated in the followinG Table 3.

TABLE 3

| | Number of successive pixels | Locations of pixels | Applied rules in Table 2 |
|---|---|---|---|
| (a) | 1 to 3 pixels | All of the pixels | (6) |
| (b) | 4 pixels | Pixels at both ends (2 pixels in total) | (5) |
| | | Pixels counted 2 from both ends (2 pixels in total) | (4) |
| (c) | 5 pixels or more | Pixels at both ends (2 pixels in total) | (5) |
| | | Pixels counted 2 from both ends (2 pixels in total) | (4) |
| | | Pixels within 3 pixels from both ends ((n-4) pixels) | (3) |

Therefore, the exposure energy of each pixel in the white image area is Ew for any shape of the white image area.

The semiconductor laser 207 used in the present embodiment is capable to varying an intensity distribution pattern of a laser beam emitted therefrom. Therefore, the same optical system as of the conventional device may be used. The fact leads to the reduction of size and cost. Alternatively, a plural number of light sources of the different intensity distribution patterns may be used. (Any of LED elements, EL elements and the like may be used for the light source, in lieu of the laser device.) In this case, those light sources are driven to project light beams onto a point at the same time.

Figure 8:
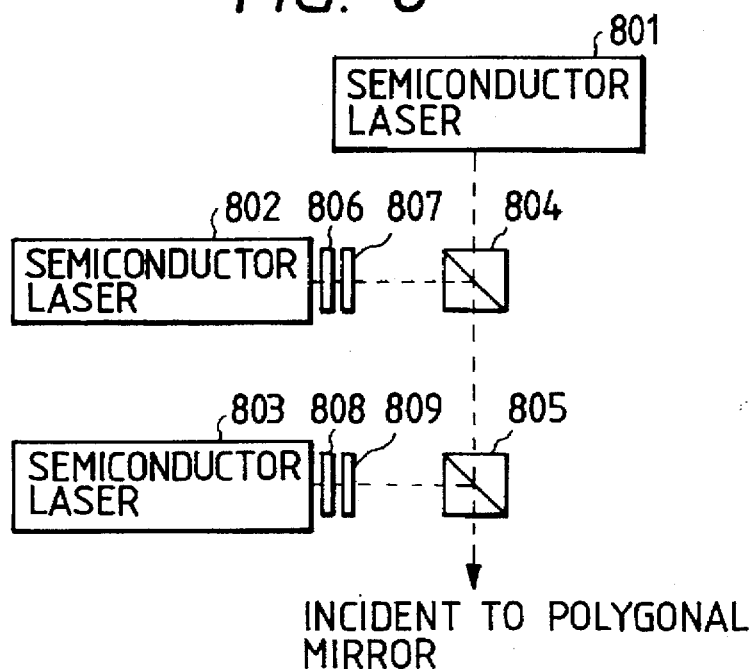
FIG. 8 is a diagram showing an arrangement of an optical system according to another embodiment of the present invention.
Figure 9:
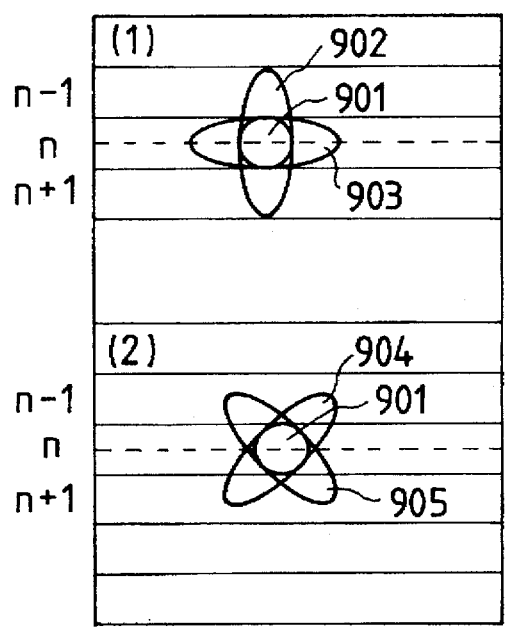
FIG. 9 is a diagram showing intensity distribution patterns of laser beams on the surface of a photoreceptor drum, formed in the embodiment of FIG. 8.

FIGS. 8 and 9 cooperate to show another embodiment of the present invention. In FIG. 8, an optical system is substituted for the semiconductor laser 207 capable of varying an intensity distribution pattern of the laser beam. General semiconductor laser devices (including collimating optical systems) 801, 802 and 803 incapable of varying an intensity distribution pattern of the laser beam are arranged so that the output powers of the laser devices are independently variable. A laser beam is emitted from the laser device 801, passes through polarization beam splitters (PBSs) 804 and 805, and led to a polygonal mirror (not shown) for polarization. Laser beams are emitted from the semiconductor lasers 802 and 803, pass through slits 806 and 808 and wave plates 807 and 809, and are led to the PBSs 804 and 805. The slits 806 and 808 are provided for varying the intensity distribution patterns of the light beams (The way of varying the intensity distribution pattern will be described with reference to FIG. 9.). The wave plates 807 and 809 are each provided for adjusting the plane of polarization of the light beam. Provision of the wave plates enables the PBSs 804 and 805 to be well coupled with the laser beam from the laser device 801. The PBSs 804 and 805 couples the three laser beams together to form a single laser beam, which in turn is focused on the photoreceptor drum.

(1) in FIG. 9 shows intensity distribution patterns of the laser beams on the surface of the photoreceptor drum. The intensity distribution pattern of the laser beam outputted from the laser device 801 takes a normal shape as indicated by reference numeral 90. The intensity distribution patterns of the laser beams from the semiconductor laser devices 802 and 803 take a vertically elongated shape 902 and a horizontally elongated shape 903, respectively. As known, those shapes of the intensity distribution patterns are formed by properly adjusting the transmittance of the slits 806 and 808. A combination of the intensity distribution patterns as shown in (2) in FIG. 9 may be realized in a similar manner. In this case, a light beam 904 corresponds to the light beam 902, and a light beam 905, to the light beam 903.

Reference is made to (1) in FIG. 9 again. The total intensity distribution of the laser beams 901 to 903 is the sum of the intensity distributions of those laser beams. Accordingly, a pattern of the total intensity distribution of the laser beams may be controlled in a manner that the output powers of the semiconductor lasers 801 to 803 are properly modulated to change a ration of them.

In the construction of the control circuit and the means shown in FIG. 2 and Table 2, only one direction (slow scan direction) of the intensity distribution pattern is taken into consideration. It is readily understood that those may be constructed taking another direction (fast or main scan direction) into consideration. The control circuit and the means may be constructed so as to be adaptable for the case of the intensity distribution patterns slanted at 45° as in (2) of FIG. 9.

The case of (1) in FIG. 9 in the present embodiment can suppress not only a density variation generated in the vertical scan direction (which appears as a horizontal stripe on the recorded image), but also a density variation generated in the main scan direction (which appears as a vertical stripe). The case of (2) in FIG. 9 can suppress a density variation generated in the direction slanted at 45°. The number of the semiconductor laser devices 802 and 803 may be properly selected. The semiconductor laser 207 capable of varying the intensity distribution pattern may be substituted for the laser devices 801 to 803.

In the present embodiment, intensity distribution pattern control means for determining intensity distribution patterns of light beams on the surface of the photoreceptor drum on the basis of the image information of peripheral pixels, and light power control means for putting the exposure energy at a predetermined value on the surface of the photoreceptor drum for the intensity distribution patterns are constructed by a logic circuitry as shown in FIG. 2. The hardware means is used for adapting those means for a high speed image recording apparatus. When those means are used in connection with low speed image forming apparatus, those means may be constructed in a software manner. In this case, the programs prepared are loaded into and processed by a computer. The results of the processing are applied as control data to the current sources 205 and 206 shown in FIG. 2.

In the embodiment described referring to FIGS. 1 through 7, the present invention is applied to the exposure control in the white image area that is described in the conventional technique 1. The invention is not limited to this exposure control, but may be applied to an exposure control in an image area set at the medium potential within an electrostatic latent image, for example, the exposure control in the white image area in the second toner image forming step in the conventional technique 2.

As seen from the foregoing description, to scan a white image area for its exposure with a laser beam, the intensity distribution pattern of the laser beam is spread while an output power of a laser device is kept constant. Therefore, a variation of the exposure energy owing to a variation of the spaces between the scanning lines is suppressed, and a white image reproduced is free from fog and high in quality.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electrophotographic image recording apparatus, comprising:

a photoreceptor;

means for uniformly charging the surface of said photoreceptor;

light beam generating means for generating a beam spot of a light beam according to image information, and for varying an amount of light beam and a light intensity distribution pattern of the beam spot on the surface of said photoreceptor;

means for scanning the surface of said photoreceptor, which is uniformly charged by said charging means, with the beam spot of the light beam generated by said light beam generating means to discharge the surface of said photoreceptor up to a medium potential;

intensity distribution pattern control means for controlling said light beam generating means according to the image information of peripheral pixels, to vary the intensity distribution pattern of the beam spot on the surface of said photoreceptor; and light beam output control means for controlling said light beam generating means to maintain the exposure energy on pixels, exposed to the beam spots of intensity distribution patterns, at a predetermined value.

2. An electrophotographic image recording apparatus according to claim 1, wherein said light beam generating means includes a plural number of light beam generators for generating light beams when the light beams land on the surface of said photoreceptor, and the intensity distribution patterns of the light beam spots formed thereon are different from one another.

3. An electrophotographic image recording apparatus according to claim 1, wherein said light beam generating means extends the intensity distribution pattern of the beam spot in the vertical scan direction on the surface of said photoreceptor.

4. An electrophotographic image recording apparatus according to claim 2, wherein said light beam generating means extends the intensity distribution pattern of the beam spot in the vertical scan direction on the surface of said photoreceptor.

5. An electrophotographic image recording apparatus according to claim 1, wherein said scanning means scans the charged surface of said photoreceptor with the beam spot of the light beam according to first image information to form a first electrostatic latent image, and scans the charged surface of said photoreceptor with the beam spot of the light beam according to second image information to form a first electrostatic latent image.

* * * * *